H. KISTNER.
PISTON AND PISTON RING.
APPLICATION FILED SEPT. 17, 1920.
1,437,977.
Patented Dec. 5, 1922.
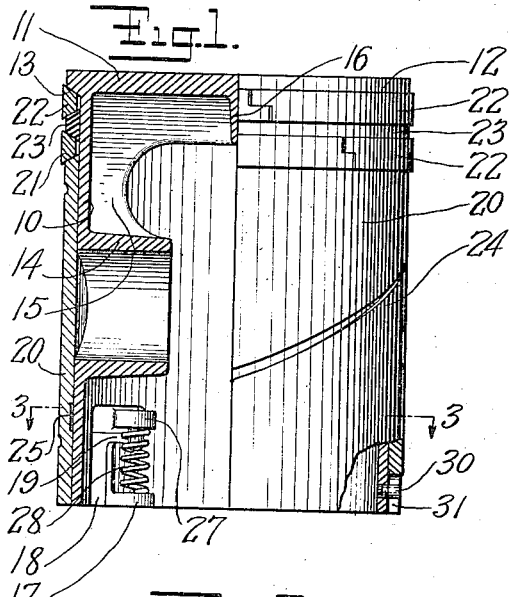
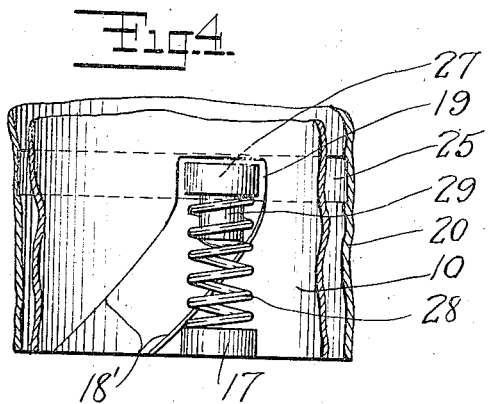
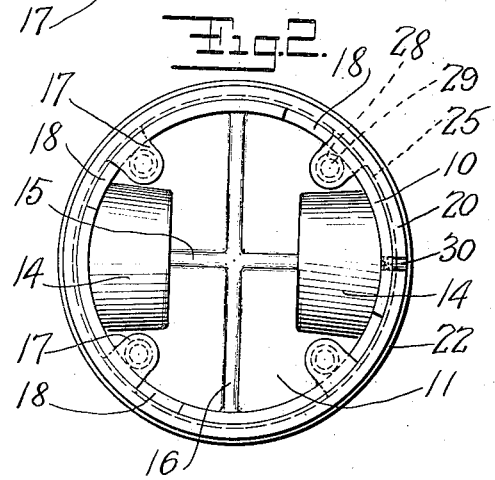
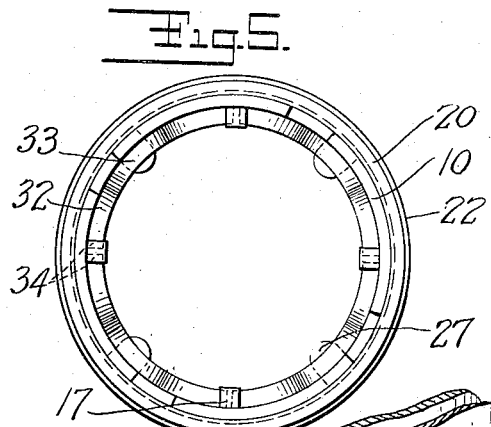
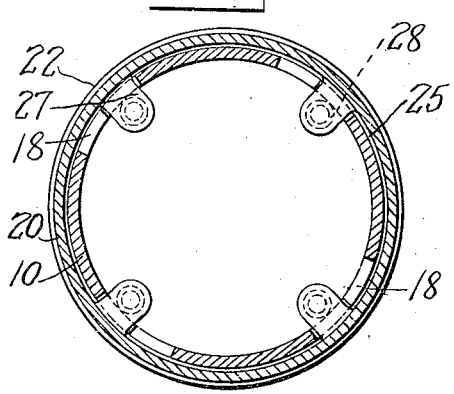
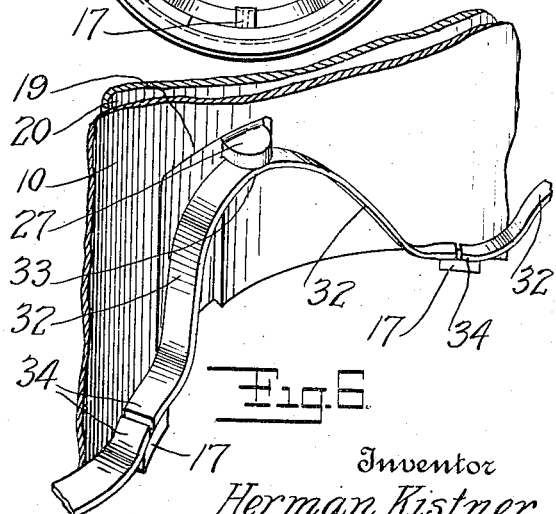
Inventor
Herman Kistner
By his Attorney Patented Dec. 5, 1922.

1,437,977

UNITED STATES PATENT OFFICE.

HERMAN KISTNER, OF ELIZABETH, NEW JERSEY.

PISTON AND PISTON RING.

Application filed September 17, 1920. Serial No. 410,946.

*To all whom it may concern:*

Be it known that I, HERMAN KISTNER, a citizen of the United States, residing in the city of Elizabeth, in the county of Union and State of New Jersey, have invented certain new and useful Improvements in Pistons and Piston Rings, of which the following is a specification.

One of the objects of this invention is in the provision of a type of piston, particularly adapted for use in gas or like explosion engines, in which the piston rings are under constant spring pressure adapted to expand the same and prevent leakage, piston wear and carbon deposit.

Other objects, becoming apparent as the description progresses, are achieved by the structural combination and arrangement of parts as hereinafter described and shown in the accompanying drawings, forming a material part of this specification, and in which:—

Figure 1 is a side elevational view, partially in section, of the assembled piston.

Figure 2 is a bottom plan view thereof.

Figure 3 is a sectional view taken on line 3—3 of Fig. 1.

Figure 4 is a fragmentary vertical sectional view showing a modification in construction.

Figure 5 is a plan view showing another modification.

Figure 6 is a perspective view showing the form of spring used in the modification shown in Fig. 5.

In the drawings the numeral 10 indicates the cylindrical body of the piston, having an outer solid head 11 formed with an annular outwardly extending flange 12 preferably bevelled on the side 13 adjoining the piston body.

Midway in the length of the piston are a pair of oppositely disposed, inwardly extending projections 14, bored in alignment, transversely to the piston, to receive a wrist pin (not shown).

These projections are materially stiffened by webs 15 extending to the head 11 and intersecting with other ribs 16 crossing the head upon its inner side.

At the opposite end of the piston are a plurality of inwardly extending lugs 17, four being shown, and adjacent to these lugs are longitudinal recesses 18 having offset upper portions 19 arranged to register with the lugs as shown in Figs. 1 and 4, forming in effect a type of bayonet joint or, as in Fig. 4 the portion 19 may be reached by a curved or angular recess 18', the purpose of the lugs and recesses being hereafter explained.

Circumjacent to the piston body 10 is a neatly fitted sleeve 20, finished on its outer surface to fit the bore of the engine cylinder, as is also the periphery of the flange 12.

The upper edge 21 of the sleeve is bevelled oppositely to the bevel 13 and disposed between these bevelled edges are packing rings 22 each having a symmetrical trapezoidal cross section and having between them a spacer ring 23 presenting bevelled side edges that upon being forced into contact with the packing rings, causes them to spring outwardly against the wall of the engine cylinder, forming a tight but sliding joint adapted to prevent leaking and also to scrape away any deposit of carbon from the cylinder.

One or more oil grooves 24 are formed in the sleeve 20 adapted to supply lubricating material as required.

Near the lower end of the sleeve 20 is an inner, annular recess 25 from which extend radial lugs 27, corresponding in number, size and disposition with the lugs 17 and enterable into the cylinder body through the recesses 18 or 18' to the offset portions 19, causing the lugs 27 and 17 to align.

Disposed between these lugs are spirally wound compression springs 28, the same being guided by pins 29 set in the lower sides of the lugs 27 and entering the coils as indicated.

From the foregoing it will be seen that the effect of the springs is to force the sleeve 20 towards the piston head 11, compressing the packing rings and causing them to expand in an obvious manner.

When the sleeve has been rotated relative to the piston body to bring the lugs into registration, a pin 30 may be passed through a slot 31 formed in the sleeve and secured in the body of the piston, thus preventing any possibility of accidental displacement of the sleeve and lugs carried by it.

In the modification shown in Figs. 5 and 6, in place of the spiral springs being inserted between the lugs, semi-elliptic springs 32 are used instead, their raised centers or crowns 33 making contact with the bottoms of the lugs 27 and their feet 34 resting upon the lugs 17 in contact with the feet or corresponding parts of adjacent springs and forming a complete undulating circle within the body of the piston, close to its inner wall, the springs being bent to its curvature.

While the piston rings have been shown and described as being bevelled upon both sides, it will be understood that if the side adjacent the sleeve be bevelled, it will cause the ring to expand when under pressure in substantially the same manner.

While the lugs 27 are shown as extending from the recess 25, it will be apparent that the recess is only used to permit machine finishing the sleeve and that the lugs may be attached by riveting or other secure means as preferred.

In general this disclosure is to be regarded as illustrative rather than limitative of the invention and that minor modifications may be made not requiring the exercise of inventive genius and without deviating from the scope of the appended claims.

I claim:

1. A piston including a cylindrical body having a head and an annular projecting flange at one end, a sleeve slidable exteriorly of said body, packing rings disposed between adjacent surfaces of said flange and sleeve, and spring means arranged within said body for maintaining said sleeve under pressure in the direction of said packing rings.

2. A piston including a cylindrical body having a head and an annular projecting flange at one end and a plurality of openings in its walls, a sleeve slidable exteriorly of said body and formed with lugs projecting inwardly loosely through said openings in the body, packing rings disposed between adjacent surfaces of said flange and sleeve, and spring means interposed between said lugs and said body to force said sleeve into engagement with said packing rings.

3. A piston including a cylindrical body having a head and an annular projecting flange at one end, said body being formed with a plurality of openings in its walls and inwardly projecting lugs, a sleeve slidable exteriorly of said body and formed with lugs extending inwardly loosely through said openings in opposed relation to said lugs on the body, and springs interposed between each pair of said opposed lugs to force said sleeve toward said packing rings.

4. A piston comprising a cylindrical body, a rigid annular ring at one end thereof, one or more packing rings adjacent said ring, a sleeve on said body abutting said packing rings, lugs extending inwardly at spaced intervals from the end of said body opposite said fixed ring, other lugs on the interior of said sleeve adapted to pass through openings in said body into registration with the first named lugs, and springs held between each pair of opposed lugs whereby said sleeve is pressed towards said fixed ring.

5. A piston comprising a hollow cylindrical body having an annularly flanged head, a sleeve movable on said body, split packing rings and a spacer each having bevelled sides, said head and sleeve being suited to engage the bevelled sides, lugs extending inwardly from the opposite end of said body, there being openings adjacent said lugs leading to recesses in alignment with the lugs, other lugs on the interior of said sleeve enterable into the recesses through the mentioned openings, and springs seated on the first named lugs abutting against the last named lugs whereby said sleeve is pressed against said rings causing said rings to expand.

6. A piston comprising a hollow cylindrical body having an annularly flanged head, a sleeve movable on said body, split packing rings and a spacer each having bevelled sides, said head and sleeve being suited to engage the bevelled sides, lugs extending inwardly from the opposite end of said body, there being openings adjacent said lugs leading to recesses in alignment with the lugs, other lugs on the interior of said sleeve enterable into the recesses through the mentioned openings registerable with the first named lugs, semi-elliptical springs, curved to suit the interior of said piston body, their juxtaposed extremities resting in paired relation on the first named lugs, their raised elements being in contact with the last named lugs, and means removably engaging between said sleeve and body preventing relative rotary motion.

This specification signed and witnessed this 15th day of September, 1920.

HERMAN KISTNER.

Witnesses:
Fred'k C. Fischer,
F. Noll.